Sept. 27, 1955 W. F. KLEMM 2,718,842
FOOD STEAMER
Filed Feb. 3, 1953 2 Sheets-Sheet 1

INVENTOR.
WILLIAM F. KLEMM.
BY
Thos S Donnelly
ATTORNEY.

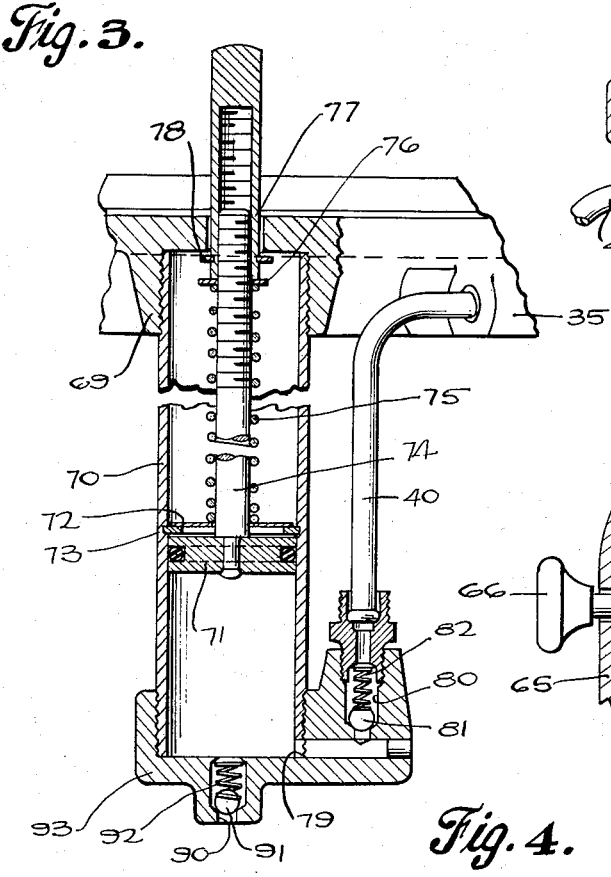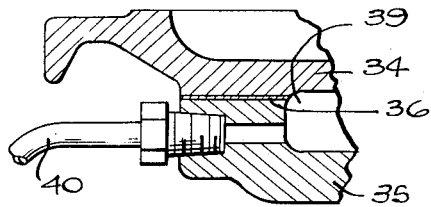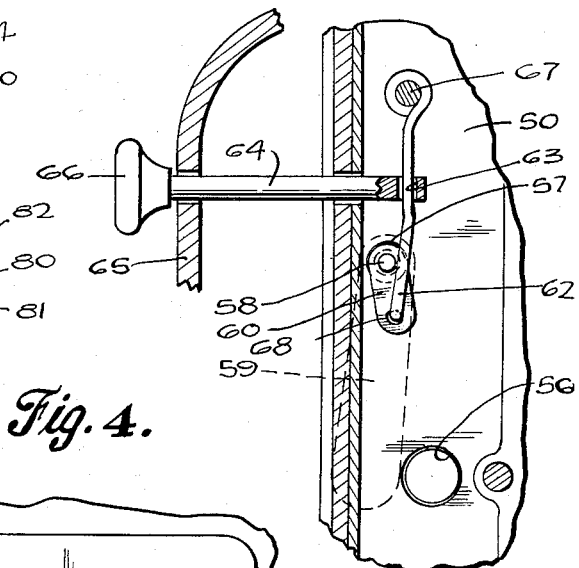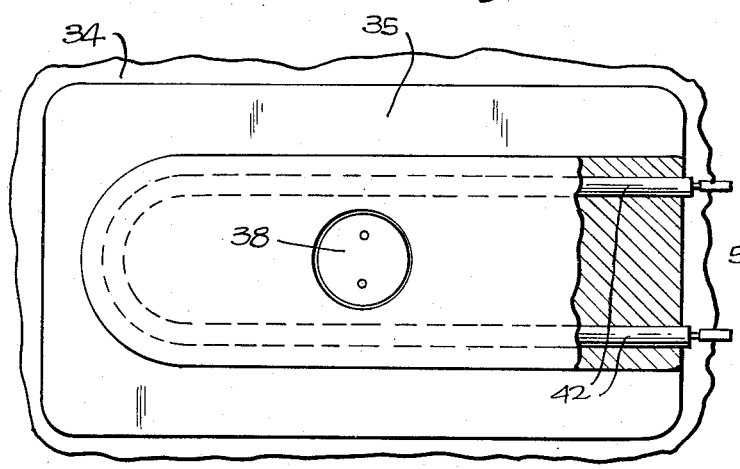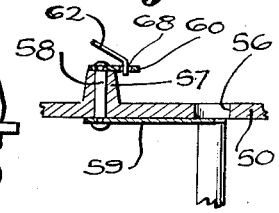

United States Patent Office 2,718,842
Patented Sept. 27, 1955

2,718,842

FOOD STEAMER

William F. Klemm, Detroit, Mich.

Application February 3, 1953, Serial No. 334,832

2 Claims. (Cl. 99—234)

My invention relates to a new and useful improvement in a food steamer, and is intended for use in steaming buns and similar articles for the purpose of refreshening the same and raising the temperature thereof. The invention is particularly useful in refreshening and heating buns which are to be used in making sandwiches.

It is an object of the present invention to provide in a food steamer of this class a presser plate which is adapted to engage and press against the buns or similar articles which are to be treated.

Another object of the invention is the provision of a structure so arranged that a presser plate may be used to press against the articles to be treated, and easily and quickly move to inoperative position so as not to engage such articles.

Another object of the invention is the provision of a water injecting pump for injecting water into a heating chamber and so arranged and constructed that upon closing the cover the injection of the water may be effected.

Another object of the invention is the provision in a food steamer of this class of a water ejecting mechanism operable upon the closing of a cover, and provided with means movable into position for preventing the operation of the water ejecting mechanism.

Other objects will appear hereinafter.

It is recognized that various modifications and changes may be made in the detail of structure illustrated without departing from the invention, and it is intended that the present disclosures shall be considered to be but the preferred embodiment.

Forming a part of this application are drawings in which,

Fig. 3 is a sectional view slightly enlarged taken on line 3—3 of Fig. 2,

Fig. 4 is a slightly enlarged elevational view taken on line 4—4 of Fig. 2,

Fig. 5 is a fragmentary sectional view taken on line 5—5 of Fig. 1,

Fig. 6 is a slightly enlarged sectional view taken on line 6—6 of Fig. 2,

Fig. 7 is a fragmentary sectional view taken on line 7—7 of Fig. 2.

Figure 1:
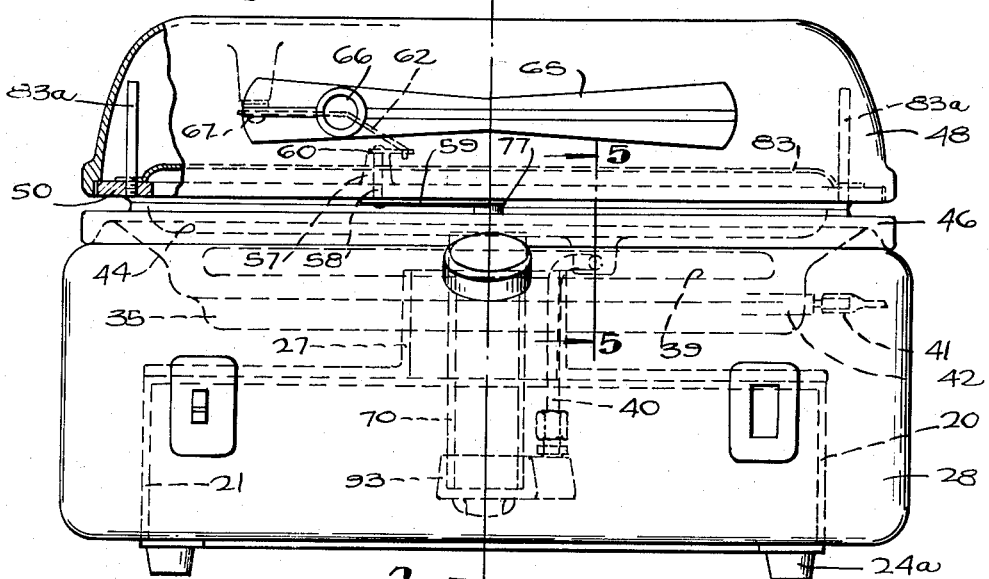
Fig. 1 is a front elevational view of the invention with a part broken away.
Figure 2:
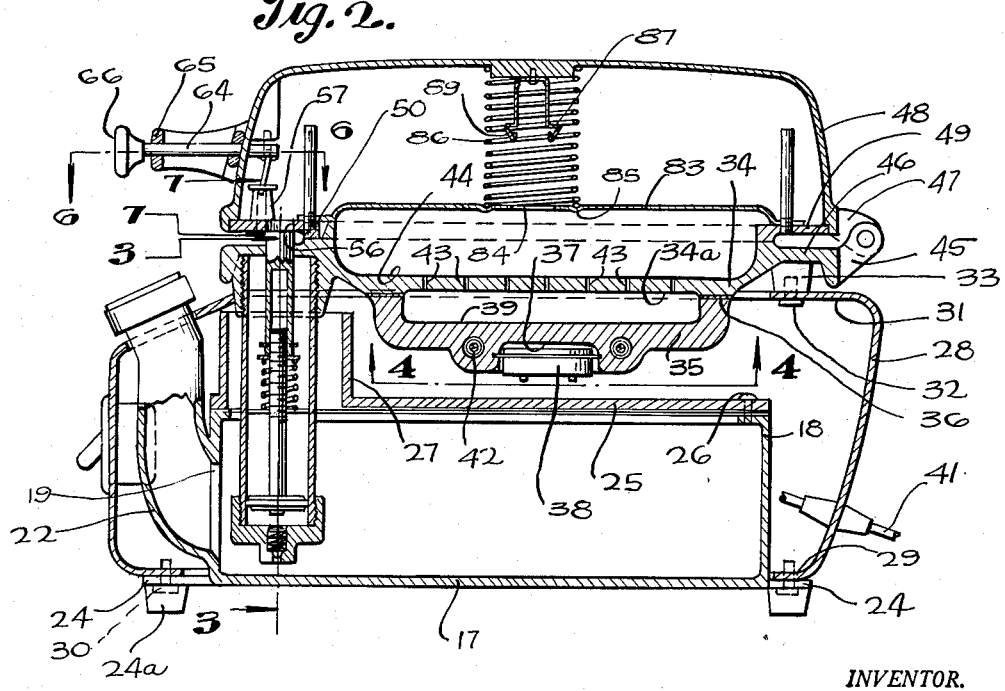
Fig. 2 is a sectional view taken on line 2—2 of Fig. 1.

In the drawings I have illustrated the invention as comprising a tank having a bottom 17, end walls 18 and 19, and side walls 20 and 21. A filling spot 22 projects outwardly from the end wall 19. Extending outwardly from the bottom 17 are legs 24. A cover 25 for the water tank rests upon the walls of this tank and is secured thereto by means of the screws 26, this cover at one end having an upwardly projecting tube 27. A casing 28 surrounds this structure and this casing is provided at the bottom with the flange 29, which is secured to the legs 24 by means of screws 30 which also pass through the supporting feet 24a.

Inwardly projecting flange 31 is formed on the casing 28 and secured by the screws 32 to downwardly projecting bosses 33 extending downwardly from the plate 34. Secured to this plate 34 is a heating plate 35 which bears against a gasket 36 positioned between the plates 34 and 35. Formed in the bottom of the plate 35 is a recess 37, in which is positioned a thermostat 38. Formed in the upper surface of the plate 35 is a recess 39 which serves to form part of a steam chamber, the remaining portion of the steam chamber being provided by the recess 34a formed in the bottom of the plate 34. A pipe 40 serves to conduct water into the chamber 39 and the injection of water into the chamber 39 will be explained below. Electric cables 41 serve to electrically connect the heating element 42 which is imbedded in the plate 35. This heating element serves to heat the water deposited into the chamber 39 and transform the same into steam which may escape through the perforations 43 formed in the plate 34. This plate 34 is provided on its upper surface with a cavity 44 in which would be deposited the bun or other article to be treated, so that the steam passing through the perforations 43 would have access to the article deposited in the cavity 44.

A lug 45 projects outwardly from the flange 46 to the plate 44 and serves as a part of a hinge to which the lug 47 may be pivotally connected, this lug 47 projecting outwardly from a cover embodying a shell 48 and a plate 49. The cover embodying these parts 48 and 49 is thus hingedly mounted on the lower section of the structure.

Extending outwardly from the plate 49 at the forward end thereof is a flange 50 in which is formed an opening 56. Extending upwardly from the flange 50 adjacent the opening 56 is a boss 57 through which extends a pin 58, and fixedly mounted on the lower end of this pin is a cover plate 59 which is adapted to swing across the opening 56. Mounted on the pin 58 is a crank 60 having an opening 68 in which an angularly turned end of a rod 62 is adapted to engage. This rod 62 is projected through a passage 63 formed in an operating plunger 64, this plunger 64 slidably projecting through the handle 65 and being provided on its end with a knob 66. This rod 62 is preferably made of resilient material and is wound around the stud 67. The construction is such that upon longitudinal movement of the plunger 64, the plate 59 may be swung to overlie the opening 56. Normally this plate 59 is retained by the rod 62 in such overlying position.

Extending outwardly from the forward end of the plate 34 so as to project slightly into the tube 27 is a tubular sleeve 69, into which is threaded one end of a cylinder 70. As shown in Fig. 3 there is a slidable piston 71 in the cylinder 70. Mounted into the cylinder 70, intermediate its ends, is a disc 72 bearing upon the ring 73. A piston rod 74 which is connected to the piston 71 slidably projects through the disc 72 and is embraced by coil spring 75. One end of this spring 75 bears against the upper face of the disc 72, and the other end bears against a collar 76 fixedly mounted on the piston rod 74 so as to normally urge the piston upwardly into the position shown in Fig. 3. Connected on the rod 74 so as to form an extension thereof is the rod 77 carrying adjacent its lower end a collar 78, this collar 78 being adapted for limiting the upward movement of the piston rod 74.

Mounted on the cylinder 70 at the lower end thereof is a base 93, formed through which is a passage 90 normally closed by the ball 91 which is pressed by the spring 92 on to its seat, this base being positioned in the water tank.

In operation, when the cover is swung upwardly, the piston rod extension 77 will be in elevated position relatively to the flange 68, and when the cover is lowered, the end of the plunger extension 77 will be engaged by the plate 59 and forced downwardly. In this movement the liquid content in the cylinder 70 below the piston 71 will be forced outwardly through the passage 79 and through the valve 81 which is pressed on its seat by the spring 82 into the chamber 80 and thence upwardly through the pipe 40 into the chamber 39. On the upward movement of the piston 71, liquid will, of course, be drawn in the cylinder 70. In this way there is a predetermined amount of liquid inducted into the heating chamber 39, and this chamber is maintained at such a temperature that this liquid is instantaneously turned into steam. When it is desired to use the mechanism without injecting any liquid into the compartment 39, the plate 59 will be swung to a position to clear the opening 56 so that as the cover is lowered, the plunger extension 77 will merely extend through the opening 56 into the cover itself.

Positioned within this cover is a presser plate 83 which may slide upwardly or downwardly on the guide pins 83a but which is normally retained pressed downwardly by means of the spring 86. This spring surrounds an opening 84 formed in the presser plate 83, this opening being reinforced by the ring 85. Mounted on the cover top 88 is a U-shaped clip 87, on each of the legs of which is formed a latch 89, these legs 87 being formed resilient. When it is desired, the plate 83 may be moved upwardly manually until the latch projects through the opening 84 and thus retains the plate 83 in elevated position.

When it is desired to use the plate 83 as a presser member, it is released from the latch and as the cover is lowered, the presser plate 83 will engage the bun or other article placed in the cavity 44 and serve to securely press it against the face of the plate 34.

Experience has shown that a food steamer of this class is highly efficient in use, and that the steaming of a bun may be effected almost instantaneously as it is not necessary, after the bun has been placed in position and the cover lowered, to retain the cover in lowered position any great length of time.

What I claim is:

1. In a food steamer of the class described having a food receiving cavity, and a swingable cover swingable to overlie said cavity; a U-shaped clip mounted on said cover and projecting inwardly therefrom with the legs thereof in spaced relation; a latch nose on the ends of each of said legs; a presser plate carried by said cover and overlying said cavity, said presser plate having an opening formed therein; and a coil spring surrounding said opening and engaging at one end a face of said plate, and engaging at its opposite end said cover; said latch noses being projectable through the opening in said plate and latching on to said plate upon movement of said plate toward said clip a predetermined distance against the compression of said spring.

2. In a food steamer of the class described having a food receiving cavity, and a swingably mounted cover swingable to overlie said cavity; a presser plate movably mounted on said cover and overlying said cavity, said presser plate having an opening formed therein; a coil spring embracing at one end said opening and engaging said plate, and engaging at its opposite end said cover for normally urging said plate away from said cover; and latch means mounted on said cover and extending inwardly of said coil spring, and engagable through the opening in said plate upon movement of said plate toward said cover a predetermined distance against the compression of said spring.

References Cited in the file of this patent

UNITED STATES PATENTS

| | | |
|---|---|---|
| 1,541,033 | Easker | June 9, 1925 |
| 1,586,528 | Balling | June 1, 1926 |
| 1,657,167 | Lidseen et al. | Jan. 24, 1928 |